United States Patent
Wang et al.

(10) Patent No.: US 7,346,355 B2
(45) Date of Patent: Mar. 18, 2008

(54) METHOD FOR DATA TRANSMISSION RATE ADAPTATION

(75) Inventors: Li-Chun Wang, Hsinchu (TW); Wei-Jen Chen, Taipei (TW); Fu-Yen Kuo, Hsinchu (TW)

(73) Assignee: Benq Corporation, Taoyuan (TW)

( * ) Notice: Subject to any disclaimer, the term of this patent is extended or adjusted under 35 U.S.C. 154(b) by 141 days.

(21) Appl. No.: 10/879,194

(22) Filed: Jun. 30, 2004

(65) Prior Publication Data

US 2005/0032541 A1   Feb. 10, 2005

(30) Foreign Application Priority Data

Jul. 1, 2003   (TW) ............................... 92117907 A

(51) Int. Cl.
*H04Q 7/20*   (2006.01)

(52) U.S. Cl. ............... 455/452.2; 455/522; 370/252

(58) Field of Classification Search ............... 455/574, 455/522, 127.1, 13.4, 452.2, 453, 423–425, 455/67.11; 370/252, 465
See application file for complete search history.

(56) References Cited

U.S. PATENT DOCUMENTS

| | | | |
|---|---|---|---|
| 6,724,742 B1* | 4/2004 | Mun et al. ................ | 370/335 |
| 6,859,656 B2* | 2/2005 | Choi et al. ................ | 455/522 |
| 7,072,681 B2* | 7/2006 | Hamabe ..................... | 455/522 |
| 2003/0002454 A1* | 1/2003 | Lee et al. .................. | 370/328 |
| 2003/0083088 A1* | 5/2003 | Chang et al. .............. | 455/522 |
| 2003/0083093 A1* | 5/2003 | Yun et al. .................. | 455/522 |
| 2004/0152422 A1* | 8/2004 | Hoglund et al. ......... | 455/67.11 |
| 2004/0266473 A1* | 12/2004 | Tsunehara et al. ......... | 455/522 |

* cited by examiner

*Primary Examiner*—Duc M. Nguyen
*Assistant Examiner*—Anthony S. Addy
(74) *Attorney, Agent, or Firm*—Birch, Stewart, Kolasch & Birch, LLP

(57) ABSTRACT

A method for data transmission rate adaptation for Wideband Code Division Multiple Access (WCDMA). The method includes A) providing a plurality of parameters, including: a maximum allowable transmission power, a minimum allowable transmission power, an increasing parameter and a decreasing parameter; B) receiving a signal; C) collecting a power excess parameter and a power deficient parameter in accordance to a transmission power control command controlling the signal's transmission power; D) determining whether the power deficient parameter is larger than the increasing parameter or not? If yes, increase the throughput, and then goes to step G, otherwise, goes to step E; E) determining whether the power excess parameter is larger than the decreasing parameter or not? If yes, reduce the throughput, and then goes to step G, otherwise, goes to step F; F) maintaining the throughput, goes to step G; G) end.

6 Claims, 5 Drawing Sheets

METHOD FOR DATA TRANSMISSION RATE ADAPTATION

This Nonprovisional application claims priority under 35 U.S.C. § 119(a) on Patent Application No(s). 092117907 filed in TAIWAN, on Jul. 1, 2003, the entire contents of which are hereby incorporated by reference.

BACKGROUND OF THE INVENTION (a). Field of the Invention

The present invention relates to a method for data transmission rate adaptation, more particularly, to a rate adaptation method for Wideband Code Division Multiple Access (WCDMA).

(b). Description of the Prior Arts

Along with the progress of technology, the use of cellular phone becomes more and more popular and, as the result, the demand for higher performance in cellular phone is increasing. That is, besides the basic voice communication, owing to the popularization of the Internet, the cellular phone users also desire to be able to use his cellular phone for data transmission. Consequently, the demand for higher data transmission rate is increasing Under the same surrounding, a cellular phone with higher transmission power can achieve a higher transmission speed. However, the transmission power of a cellular phone is limited. Moreover, a cellular phone with high transmission power is prone to create interferences to its neighboring users and, in consequence, forces the neighboring users to increase their transmission power which create interferences in return. Accordingly, a positive feedback effect similar to the armament race is generated. Hence, it is obvious that to increase the transmission power is not a good idea for increasing transmission speed. In addition, the increasing of transmission power also increases the power consumption that reduces the battery usage time and causes inconvenience for users.

In fact, environment is a major factor considering the quality of radio communication. Including path loss and noise interference can have influence on transmission power for better communication quality. Therefore, in order to have a satisfactory communication quality, it is inclined to increase the transmission power or to reduce the transmission speed for reducing bit error rate when in worse communication environment, on the contrary, it is inclined to reduce the transmission power or to increase the bitrate for increasing throughput. Hence, in the Third Generation Partnership Project (3GPP), A principle specification is being made for adaptive power and rate jointly. Please refer to FIG. 1, which is a guideline for adaptive power and rate jointly in 3GPP. The base station using 3GPP will set a limit to the transmission power of each cellular phone, that is, the transmission power of cellular phone is restricted within a working range [the maximum allowable transmission power, the minimum allowable transmission power]. The cellular phone will search an appropriate transmission rate with in this working range. If the transmission power of cellular phone is larger than the maximum allowable transmission power, the situation represents that the transmission environment is worsening and requires a larger transmission power to maintain the data transmission rate. However, the adequate response now is to reduce the data transmission rate, rather than increase the transmission power. As aforementioned, the increasing of transmission power will result in a worse interference to the other users and, as such, will also result in a disadvantage to oneself. If the transmission power of cellular phone is smaller than the minimum allowable transmission power, the situation represents that the transmission environment is better than expected and a lower transmission power can be used to achieve the expected effect, therefore, the transmission power can be increased to the range not exceeding the working range for increasing the throughput. Although the increase of transmission power will cause interference to the other users, but the interference caused by the transmission power within the working range is anticipated and, in consequence, is acceptable. If the transmission power is within the working range [the maximum allowable transmission power, the minimum allowable transmission power], the situation represents that the communication is under control and the current data transmission rate is maintained.

Although the guideline of joint rate and power control has been specified in the 3GPP standard, to our best knowledge, however, it still remains an open issue for anyone in the field to develop his own proprietary adaptation algorithm. The current available algorithms provided in the literatures such as 3GPP TS 25.922, "Radio resource management strategies" V4.1.0, June 2001 or C. W. Sung etc, "Power Control and Rate Management for Wireless Multimedia CDMA System", IEEE Trans. On Communication, Vol. 49, No. 7, pp. 1215-1226, July 2001, which centralize rate and power assignment and is difficult to realize because of the complexity of hardware design; and as Kin K. Leung etc, "Controlling QoS by Integrated Power Control and Link Adaptation in Broadband Wireless Network", European Transaction On Communication, July-August Issue, 2000, which adjusts rate and power basing on the measurement of Signal to Noise Ratio (SNR) for each frame, however, when a SNR is huge, the SNR of the next frame might drop rapidly that causes the system to misinterpret the situation. In application, the method using a reference table is adopted for search solutions. Please refer to FIG. 2, which is a reference table currently used, wherein the horizontal line represents the strength of signal and the vertical line represents the throughput. Normally, the cellular phone will transmit a test signal first to the base station and, in return, the base station will transmit a feedback to the cellular phone according the SNR result of the test signal. The process is called close loop process. In accordance to the feedback and the reference table, the cellular phone can obtain several sets of processing gain and their corresponding throughputs, the same time, one set out of the obtained sets is adopted according to the current surroundings. For example, when the feedback SNR of the base station is 0, the cellular phone will choose a processing gain with higher throughput, thus, the processing gain=16 (as the —*— line seen in FIG. 2) and its corresponding throughput, and then adjust the throughput according to the information transmitted from the base station.

However, the current method has a major shortcoming, that is, a ping-pong effect will be incurred. When the variation of the environment is huge, the SNR will be affected and the throughput is instable that it may be raised as soon as it is decreased. The ping-pong effect is harmful to the data transmission. It will cause the loss of data packet and must be resolved.

SUMMARY OF THE INVENTION

The primary object of the present invention is to provide a method for data transmission, which is stable and without incurring the ping-pong effect.

The secondary object of the present invention is to provide a method for data transmission, which can transmit a most amount of throughput using the least power.

In order to achieve the above objects, the present invention includes the following steps:

A: Providing a plurality of parameters, including: a maximum allowable transmission power, a minimum allowable transmission power, an increasing parameter and a decreasing parameter;

B: Receiving a signal;

C: Collecting a power excess parameter and a power deficient parameter in accordance to a transmission power control command controlling the signal's transmission power;

D: Determining whether the power deficient parameter is larger than the increasing parameter or not? If yes, increase the throughput, and then goes to step G, otherwise, goes to step E;

E: Determining whether the power excess parameter is larger than the decreasing parameter or not? If yes, reduce the throughput, and then goes to step G, otherwise, goes to step F;

F: Maintaining the throughput, goes to step G;

G: End.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The following embodiments will illustrate the device and the method for processing the digital image of the present invention in detail.

The present invention proposes to utilize the transmission power control (TPC) commands containing within the signals for rate adaptation. In the W-CDMA system, both the up link (UL) and down link (DL) data channels are divided into time slots and frames, wherein the length of each time slot is 666.667 μsec and is equivalent to the length of 2560 chips under the transmission speed of the chip system, also a 10 ms frame is formed from serially connecting 15 time slots together and is a basic unit for channel coding and data interleaving process. However, some key information closely related with time is added to each time slot, which are usually data of 1 bit length, such as transmission power control (TPC) bit. When the TPC bit is "1" representing to raise the transmission power by one unit; When the TPC bit is "0" representing to decrease the transmission power by one unit. The common unit used nowadays is 1 db, that is, when the TPC bit is "1", than increase the transmission power by 1 db; when the TPC bit is "0", than decrease the transmission power by 1 db. The present invention can achieve the object of controlling data transmission rate by using the additional information carried by the TPC bit.

Figure 1:
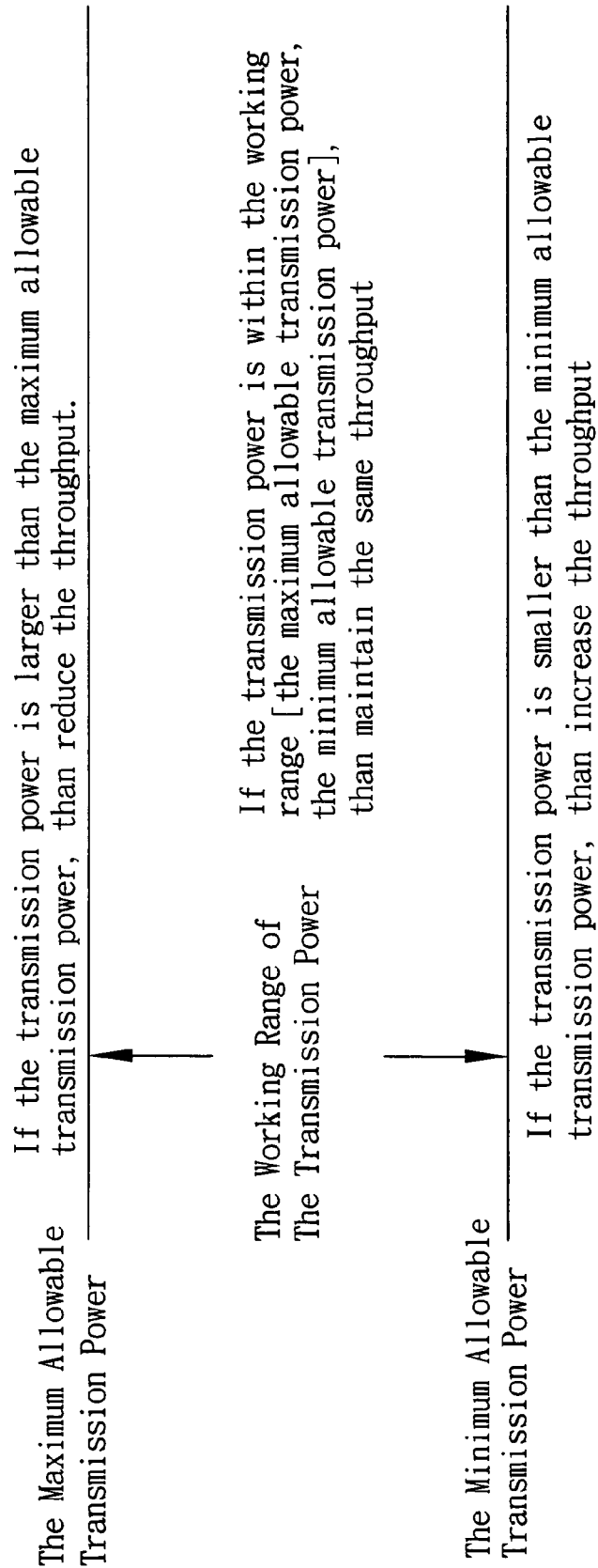
FIG. 1 is a guideline for adaptive power and rate jointly in 3GPP.
Figure 2:
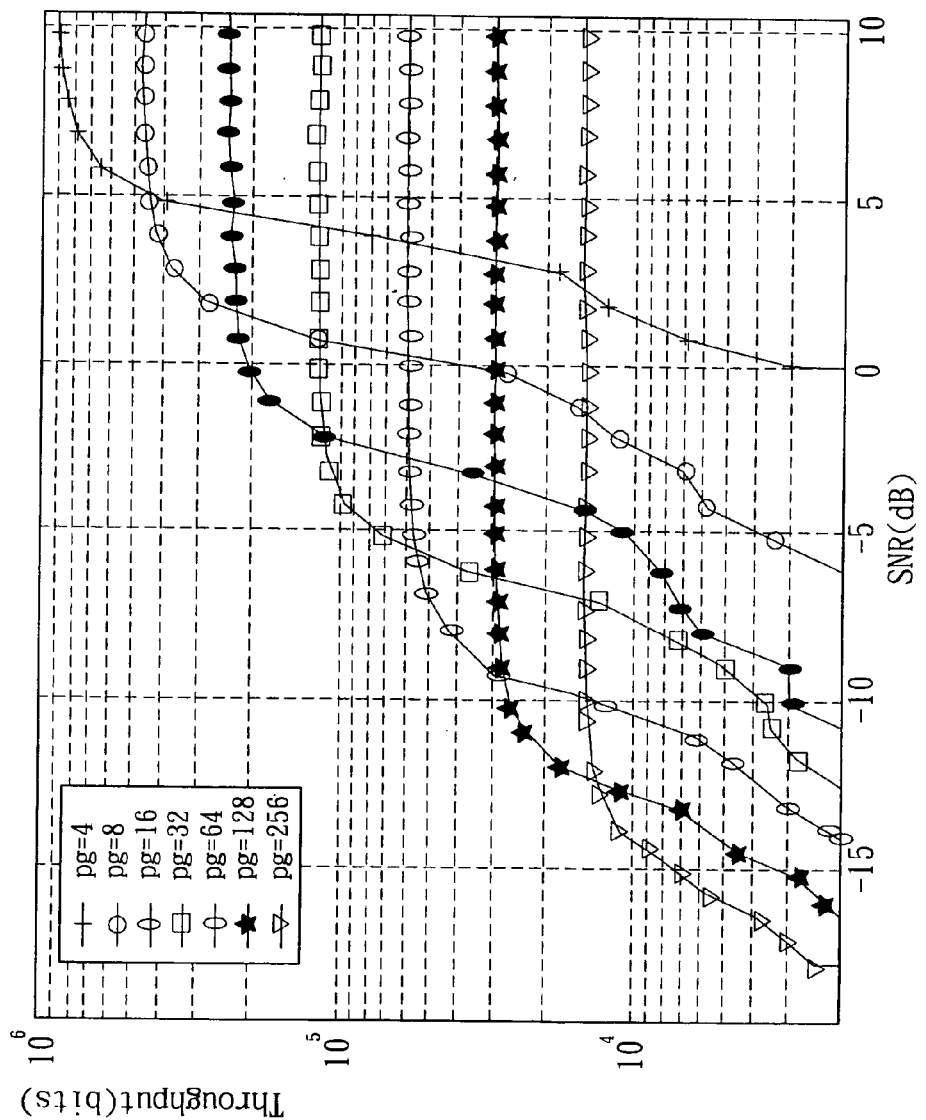
FIG. 2 is a reference table.
Figure 3:
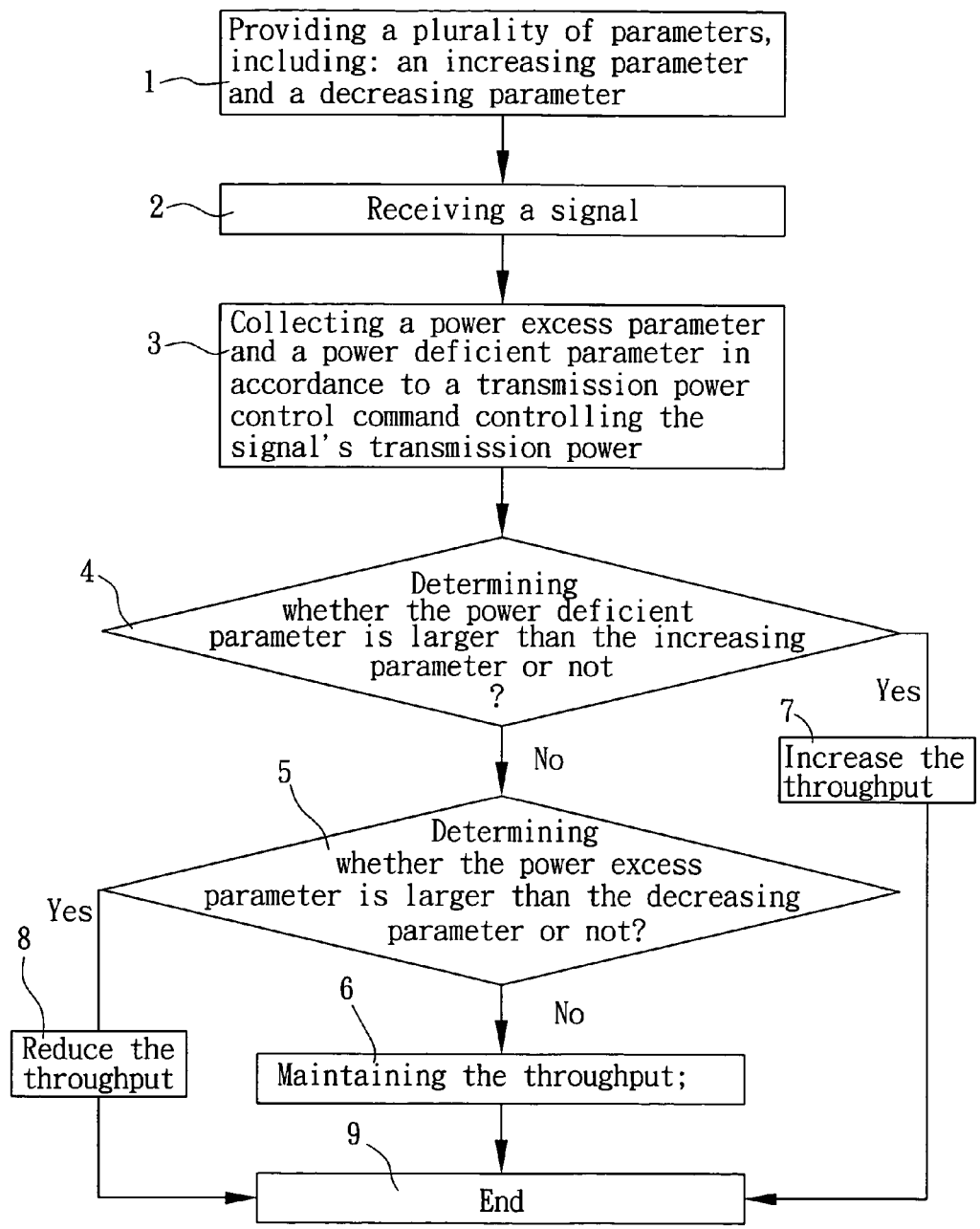
FIG. 3 is a flowchart of the present invention.

Please refer to FIG. 3, which is a flowchart of the present invention. After the base station sends back the signal strength information to the cellular phone, the present invention comes into play. The present invention includes the following steps:

Step 1: providing a plurality of parameters, including: an increasing parameter and a decreasing parameter; wherein the increasing parameter and the decreasing parameter are related to the increase and decrease of data transmission rate, as to the detailed description of how to set up the above parameters will be provided hereinafter.

Step 2: Receiving a signal; wherein, in the W-CDMA system, as mentioned before, frame is a basic unit for processing the transmission signal, and each frame comprises 15 time slots.

Figure 4:
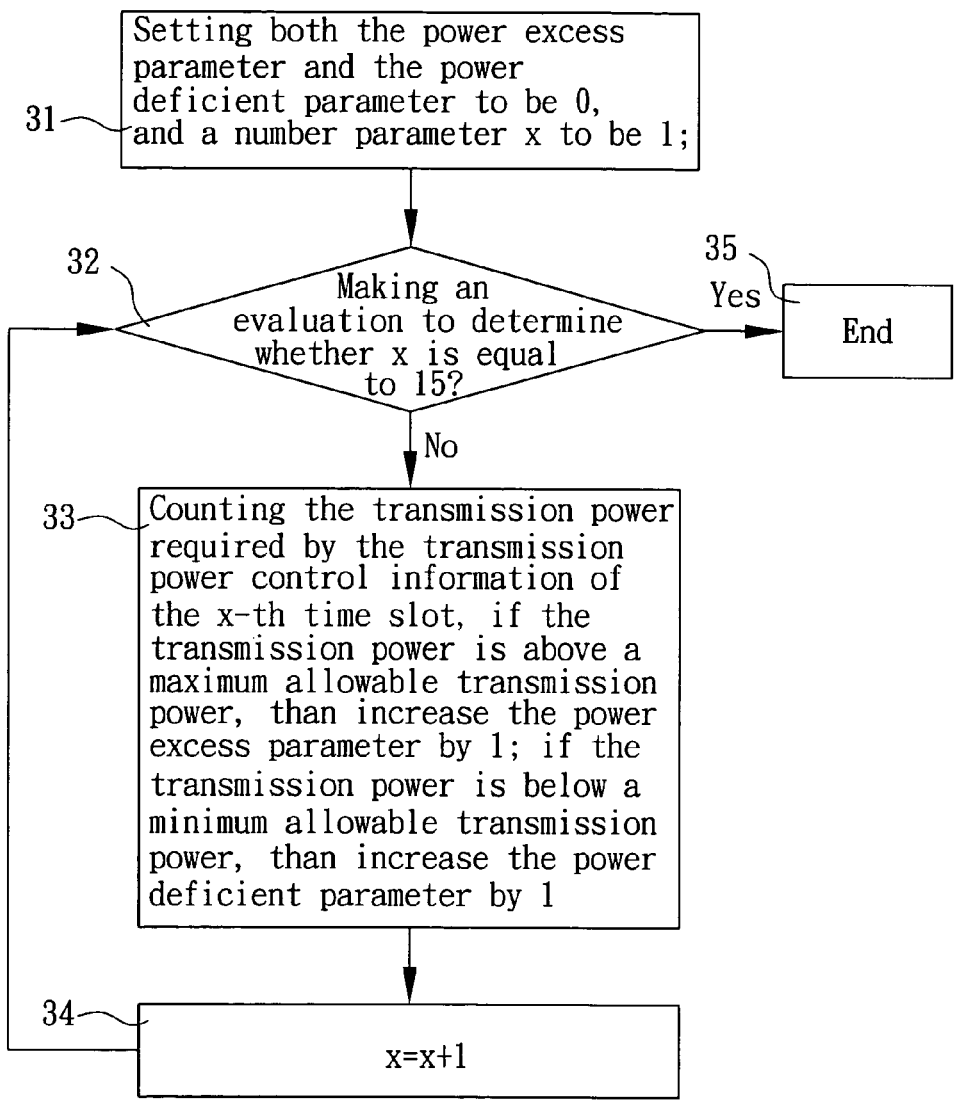
FIG. 4 is flowchart depicting an embodiment of the present invention.

Step 3: Collecting a power excess parameter and a power deficient parameter in accordance to a transmission power control (TPC) command controlling the signal transmission power; wherein, since each time slot contains the transmission power control information sent back from the base station to the cellular phone, the two counts respectively counting the number of times that the transmission power exceeds the maximum allowable transmission power and below the minimum allowable transmission power can be used as an evaluation basis for the following steps, the same time, please refer to FIG. 4, which is an embodiment of the step 3, and the step 3 can be achieved using the following steps:

Step 31: Setting both the power excess parameter and the power deficient parameter to be 0, and a number parameter x to be 1;

Step 32: Making an evaluation to determine whether x is equal to 15? If yes, than goes to step 35; otherwise goes to step 33;

Step 33: Counting the transmission power required by the transmission power control information of the x-th time slot, if the transmission power is above a maximum allowable transmission power, than increase the power excess parameter by 1; if the transmission power is below a minimum allowable transmission power, than increase the power deficient parameter by 1; wherein the working range of the cellular phone is [the maximum allowable transmission power, the minimum allowable transmission power];

Step 34: Increasing x by 1;

Step 35: End.

Step 4: Making an evaluation to determine whether the power deficient parameter is larger than the increasing parameter? If yes, than goes to step 7; otherwise, goes to step 5; wherein, the condition that the power deficient parameter is larger than the increasing parameter represents the existence of a good communication environment, so that the throughput can be increased.

Step 5: Making an evaluation to determine whether the power excess parameter is larger than the decreasing parameter?? If yes, than goes to step 8; otherwise, goes to step 6; wherein, the condition that the power deficient parameter is larger than the decreasing parameter represents the existence of a bad communication environment, so that the throughput needs to be reduced.

Step 6: Maintaining the throughput, goes to step 9; if the power deficient parameter is not larger than the increasing parameter, or the power excess parameter is not larger than the decreasing parameter, the condition represents that the environment is still under estimation and therefore no adjustment is being made.

Step 7: Increasing throughput, goes to step 9.
Step 8: Decreasing throughput, goes to step 9.
Step 9: End.

The following discussion is about how to set up the parameters needed in the present invention. First is to define a working range of a cellular phone, that is, to define the maximum allowable transmission power, the minimum allowable transmission power. Normally, a base station will send a message to inform a cellular phone that how much transmission power is required. The required transmission power, excluding the influences of its surrounding, is the ideal transmission power of the cellular phone, which can be represented as:

$$P=P_T+P_L-P_G+N;$$

P represents an ideal transmission power;
$P_T$ represents an object transmission power, i.e. the signal strength of the cellular phone anticipated by the base station.
$P_L$ represents a path loss caused by the signal's transmitting in space.
$P_G$ represents a processing gain.
N represents a power of noise, i.e. noise interference power.
wherein, for simplicity, each item within the above equation can be represented using db as it unit.

By increase and decrease the ideal transmission power, than obtains the maximum allowable transmission power, the minimum allowable transmission power as following:

the maximum allowable transmission power:
$$P_U=P+t_1;$$

the minimum allowable transmission power:
$$P_D=P-t_2;$$

wherein $t_1$ is tolerance 1, $t_2$ is tolerance 2, $t_1$ and $t_2$ can be adjusted according to current surroundings. Under normal situation, the simulation made in the present invention proves 3 db can achieve the best outcome.

Secondly is to set up the increasing parameter and the decreasing parameter. The increasing parameter and the decreasing parameter actually are the standards used by the present invention to determine whether should the throughput be increased or decreased: when the power excess parameter is larger than the decreasing parameter, than the throughput is reduced; when the power deficient parameter is larger than the increasing parameter, than the throughput is raised. Therefore, the key point of the present invention is how to appropriately set up the increasing parameter and the decreasing parameter. There are several reference factors for choosing the increasing parameter and the decreasing parameter. First, the increasing parameter and the decreasing parameter should not be too large. For the embodiment of the present invention, the increasing parameter and the decreasing parameter should not exceed or even close to 15. Because the larger the increasing parameter and the decreasing parameter are set, the harder the throughput can be changed, so that either the users will miss the chance to increase throughput which miss the meaning of the present invention, or the users will use a overly high throughput for data transmission under a very bad communication environment which will incur a loss of data packet. Second, the increasing parameter and the decreasing parameter should not be too small. Because the smaller the increasing parameter and the decreasing parameter are set, the easier for the power excess parameter and the power deficient parameter to achieve the increasing parameter and the decreasing parameter, such that the system will become to sensitive that not only the according adjustment might not be appropriate for the current communication environment, the throughput might be change too frequently to incur the ping-pong effect. Therefore, through experiments and simulations, the present invention concludes that the increasing parameter should be a middle number, and the decreasing parameter should be a smaller number. That is, it is better to take a conservative approach so that a better effect can be achieved. In an other word, if the transmission power is too high, the power should be reduce to maintain the transmission quality, otherwise, if the transmission power is not exceeding the minimum allowable transmission power, before raising the throughput, it is advised to wait and see to make sure the communication environment is really becoming better. In the embodiment of the present invention, it is advised to set the increasing parameter as 12 and the decreasing parameter as 5 for a better effect.

Figure 5:
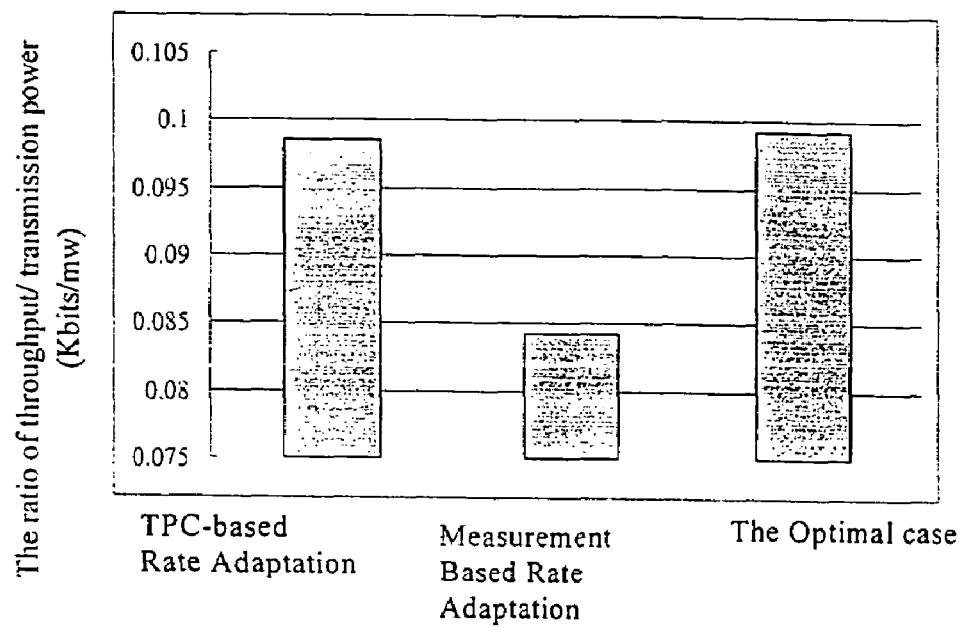
FIG. 5 is a diagram showing that comparison of the present invention with the conventional method.

Please refer to FIG. 5, which is a diagram showing that comparison of the present invention with the conventional method. The horizontal line represents the present invention, the conventional method, and the optimal case in order. The vertical line represents the ratio of throughput over the transmission power, i.e. the amount of data can be sent using one unit of the transmission power. It is obvious that, not only the present invention is far better than the conventional method, the present invent is only a slight inferior to the optimal case which is almost impossible to achieve. Thus, the superiority of the present invention is certain. The amount of data can be sent by each unit of the transmission power directly influence the operating time of the battery. The battery's operating time is always the focus of cellular phone design. The superiority of the present invention is able to achieve the purpose of power saving through software programming without change the other part of the cellular phone design.

While the present invention has been shown and described with reference to a preferred embodiment thereof, and in terms of the illustrative drawings, it should be not considered as limited thereby. Various possible modification, omission, and alterations could be conceived of by one skilled in the art to the form and the content of any particular embodiment, without departing from the scope and the sprit of the present invention.

What is claimed is:

1. A method for determining a throughput for a wireless device, the wireless device communicating with a base station, comprising steps of:
    A: Determining a transmission power, a maximum allowable transmission power, a minimum allowable transmission power for the wireless device;
    B: Providing an increasing parameter and a decreasing parameter;
    C: Receiving a frame of a signal from the base station, the frame having a plurality of slots, each slot having a transmission power control command;
    D: For each slot, determining the transmission power according to the transmission power control command, if the transmission power is above the maximum allowable transmission power, increasing a power excess parameter by one and if the transmission power is below a minimum allowable transmission power increasing a power deficient parameter by one;
    E: Increasing the throughput of the wireless device if the power deficient parameter is larger than the increasing parameter;

F: Reducing the throughput of the wireless device if the power excess parameter is larger than the decreasing parameter;

G: Maintaining the throughput, if the power deficient parameter is not larger than the increasing parameter and if the power excess parameter is not larger than the decreasing parameter.

2. A method for data transmission rate adaptation, which is used for a throughput adaptation of a wireless device comprising the steps of:

A: Providing a transmission power, a maximum allowable transmission power and minimum allowable transmission power, an increasing parameter and a decreasing parameter to the wireless device;

B: Receiving a frame of a signal, the frame having a preset number of time slots;

C: Setting a power excess parameter and a power deficient parameter to be 0, and a number parameter to be 1;

D: Counting the transmission power of the wireless device according to each of the transmission power control commands in the frame if the transmission power is above the maximum allowable transmission power, increasing the power excess parameter by 1; and if the transmission power is below a minimum allowable transmission power, increasing the power deficient parameter by 1;

E: If the number parameter is equal to the preset number, goes to step G; and

F: Increasing the number parameter by 1;

G: Increasing the throughput of the wireless device if the power deficient parameter is larger than the increasing parameter;

H: Reducing the throughput of the wireless device if the power excess parameter is larger than the decreasing parameter; and I: Maintaining the throughput, if the power deficient parameter is not larger than the increasing parameter and if the power excess parameter is not larger than the decreasing parameter.

3. The method for data transmission rate adaptation of claim 2 wherein the increasing parameter and the decreasing parameter can be modified in real time.

4. The method for data transmission rate adaptation of claim 2 wherein the maximum allowable transmission power is determined by (the maximum allowable transmission power)=(an object transmission power)+(a path loss)−(a processing gain)+(a noise transmission power)+(a first tolerance); wherein the object transmission power is the signal strength of a cellular anticipated by a base station, the path loss is caused by the signal's transmitting in space, the processing gain is the power required for performing a spread spectrum process on a signal, the noise transmission power is the power of noise interference.

5. The method for data transmission rate adaptation of claim 2 wherein the minimum allowable transmission power is determined by (the minimum allowable transmission power)=(an object transmission power)+(a path loss)−(a processing gain)+(a noise transmission power)+(a second tolerance); wherein the object transmission power is the signal strength of a cellular anticipated by a base station, the path loss is caused by the signal's transmitting in space, the processing gain is the power required for performing a spread spectrum process on a signal, the noise transmission power is the power of noise interference.

6. The method for data transmission rate adaptation of claim 2 wherein both the maximum allowable transmission power and the minimum allowable transmission power can be represented using decibel.

* * * * *